US 9,345,994 B2

(12) United States Patent
Morris (10) Patent No.: US 9,345,994 B2
(45) Date of Patent: May 24, 2016

(54) METHOD OF INCREASING EFFICIENCY OF A Y STRAINER AND A Y STRAINER

(71) Applicant: Jay R Morris, Grande Prairie (CA)

(72) Inventor: Jay R Morris, Grande Prairie (CA)

( * ) Notice: Subject to any disclaimer, the term of this patent is extended or adjusted under 35 U.S.C. 154(b) by 370 days.

(21) Appl. No.: 13/740,568

(22) Filed: Jan. 14, 2013

(65) Prior Publication Data

US 2014/0027357 A1    Jan. 30, 2014

(30) Foreign Application Priority Data

Jul. 27, 2012  (CA) ..................................... 2784238

(51) Int. Cl.
| | | |
|---|---|---|
| *B01D 35/02* | (2006.01) | |
| *B01D 27/08* | (2006.01) | |
| *F16L 55/24* | (2006.01) | |
| *E03B 7/07* | (2006.01) | |
| *B01D 29/52* | (2006.01) | |
| *B01D 29/25* | (2006.01) | |
| *B01D 46/00* | (2006.01) | |

(52) U.S. Cl.
CPC ................ *B01D 27/08* (2013.01); *B01D 29/52* (2013.01); *B01D 35/02* (2013.01); *E03B 7/074* (2013.01); *F16L 55/24* (2013.01); *B01D 29/25* (2013.01); *B01D 46/0017* (2013.01); *Y10T 137/0318* (2015.04)

(58) Field of Classification Search
None
See application file for complete search history.

(56) References Cited

U.S. PATENT DOCUMENTS

| | | | | |
|---|---|---|---|---|
| 2,125,532 | A * | 8/1938 | Wells | 210/414 |
| 3,109,809 | A * | 11/1963 | Verrando, Jr. | 210/130 |
| 3,959,140 | A * | 5/1976 | Legras | 210/107 |
| 4,495,072 | A * | 1/1985 | Fields | 210/238 |
| 4,745,943 | A * | 5/1988 | Mortensen | 137/177 |
| 5,772,879 | A * | 6/1998 | Jaikaran | 210/321.69 |
| 2005/0023196 | A1 | 2/2005 | Ku | |
| 2011/0132817 | A1* | 6/2011 | Gardner et al. | 210/90 |

OTHER PUBLICATIONS

Canadian Office Action issued in corresponding Canadian Application No. 2,802,263 mailed Sep. 30, 2013.
International Search Report issued in corresponding International Application No. PCT/CA2013/050586 mailed Sep. 30, 2013.
Vertical Basket Strainer, Radafab Oilfield & Industrial Supply Inc., at least as early as Nov. 11, 2011, retrieved from http://www.radafab.com/site/wp-content/uploads/2015/01/Basket-Strainer-Radafab.pdf.

* cited by examiner

*Primary Examiner* — Terry Cecil
(74) *Attorney, Agent, or Firm* — Davis & Bujold PLLC; Michael J. Bujold (57) ABSTRACT

A method of increasing efficiency of a Y strainer and Y strainer modified in accordance with the method. The Y strainer is of the type that has a filter cartridge receiving inflow through one end and outflow through apertures in a peripheral sidewall. The method involves slowing a velocity of fluids entering the filter cartridge of the Y strainer by having the fluids pass from a first bore of a first diameter into a second bore of a second diameter which is at least 50% larger than the first diameter prior to entering the filter cartridge. The filter cartridge also has the second diameter. This modification has been found to dramatically improve the performance of the Y strainer.

12 Claims, 7 Drawing Sheets

METHOD OF INCREASING EFFICIENCY OF A Y STRAINER AND A Y STRAINER

FIELD

There is described a method of increasing the efficiency of a Y strainer and a Y strainer that has been modified in accordance with the teachings of the method.

BACKGROUND

Y strainers are used to capture particulate matter in piping systems. They are so named due to their Y shaped configuration. Y strainers have also been referred to as Y "filters". Whether a label of a Y "strainer" or Y "filter" is given to the device depends upon aperture size. As a general rule, Y devices which only are capable of capturing contaminants larger than 200 microns are termed "strainers" and Y devices apertures which are capable of capturing contaminants smaller than 200 microns are terms "filters". For the purpose of this paper, no such distinction will be made and the term of Y strainer will be used in its broader more inclusive sense to denote the configuration.

When a hydrocarbon producing well has a sand problem, there are known sand separators that can be placed on the well. These sand separators are expensive units costing over $100,000.00 and are, therefore, only placed on wells that clearly have a long term, as opposed to a temporary sand problem.

When formation conditions are appropriate, hydrocarbon producing wells are stimulated by fracturing the formation with sand, a technique known as "fracing". For this fracing procedure, very fine abrasive sand is used. Problems are being experienced with some of this fine abrasive sand appearing, without warning, in well production. The problem is not apparent until it manifests itself and sand starts appearing in the equipment. When it occurs, it can be difficult to determine whether the formation is merely "burping" small amounts of sand periodically or whether there is a more serious sand problem requiring a sand separator. The problem cannot be ignored. Even when present in small quantities, sand can damage equipment. When present in larger quantities, abrasive sand can wear through pipes and cause serious problems resulting in leakage into the environment and the threatening the lives of oil field workers.

Attempts have been made to use Y strainers until the magnitude of any sand problem can be determined. These attempts have been unsuccessful. The Y strainers presently available are not able to deal with the fine abrasive sand. There will now be described a method that was used to make the Y strainer more efficient in dealing with fine sand and a form of Y strainer that was built in accordance with the teachings of the method.

SUMMARY

According to one aspect, there is provided a method of increasing efficiency of a Y strainer. The Y strainer is of the type that has a filter cartridge receiving inflow through one end and outflow through apertures in a peripheral sidewall. The method involves slowing a velocity of fluids entering the filter cartridge of the Y strainer by having the fluids pass from a first bore of a first diameter into a second bore of a second diameter which is at least 50% larger than the first diameter prior to entering the filter cartridge. The filter cartridge also has the second diameter.

It was determined that by having fluids pass into a larger bore, the velocity of the fluids was reduced and a Y strainer that had previously had been ineffective captured a majority (over 75%) of the sand.

It was subsequently determined that the velocity of fluids entering the filter cartridge of the Y strainer could be further slowed by positioning a physical barrier across an inlet pipe, such that the fluids strike the physical barrier prior to entering the filter cartridge. The physical barrier used was a deflector plate. The deflector plate was originally added to protect the filter element. However, it was determined that the addition of the deflector plate also served to increase efficiency by bringing the amount of sand captured to over 90%.

According to another aspect, there is provided a Y strainer assembly constructed in accordance with the teachings of the method. The Y strainer has an inlet pipe having a first portion of a first diameter and a second portion of a second diameter that is 50% larger than the first diameter. An outlet pipe of similar construction is provided having a first portion of the first diameter and a second portion of the second diameter. A cartridge receiving pipe of the second diameter is in fluid communication with the second portion of the inlet pipe and the second portion of the outlet pipe. Fluids pass from the inlet pipe into the cartridge receiving pipe and from the cartridge receiving pipe into the outlet pipe. The cartridge receiving pipe has a closure which can be opened to facilitate insertion of a filter cartridge. A filter cartridge is provided having an inlet at an inlet end for receiving an inflow of fluids from the inlet pipe and apertures in a peripheral sidewall through which an outflow of fluids pass into the outlet pipe.

As described in relation to the method, the operation of the Y strainer assembly can be enhanced through the use of a deflector. It is preferred that the filter cartridge support a deflector, such that fluids flowing along the inlet pipe strike the deflector and are deflected into the inlet end of the filter cartridge.

In order to further improve performance, the filter cartridge has been modified to include an inner sleeve with flow apertures and a flexible mesh filter which is retained between the inner sleeve and the peripheral sidewall. The inner sleeve both supports and protects the flexible mesh filter. The flexible mesh filter can readily be inspected for wear and replaced.

In order to further improve performance, the filter cartridge has been modified so that the inlet end of filter cartridge defines a wedge. The wedge at the inlet end is wedged into the inlet pipe to make a connection through which fluids flow from the inlet pipe into the inlet end of the filter cartridge.

In order to monitor sand accumulation, an upstream sensor is positioned in the inlet pipe upstream of the filter cartridge and a downstream sensor is positioned in the outlet pipe downstream of the filter cartridge. A differential in output between the upstream sensor and the downstream sensor providing an indication of sand accumulation within the filter cartridge.

In order to empty the filter cartridge, a blow down valve is positioned in the closure of the cartridge receiving pipe. This allows service personnel to rapidly purge sand accumulations from the filter cartridge.

It is also preferred that valves are positioned on the inlet pipe and the outlet pipe. These valves can be used for a variety of purposes. One purpose is to selectively isolate the Y strainer. Another purpose is injection of chemicals, such as methanol.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

A Y strainer assembly generally identified by reference numeral 10, will be described with reference to FIG. 1 through 5. A variation of the Y strainer assembly generally identified by reference numeral 100, will be described with reference to FIG. 6 through FIG. 9.

Figure 1:
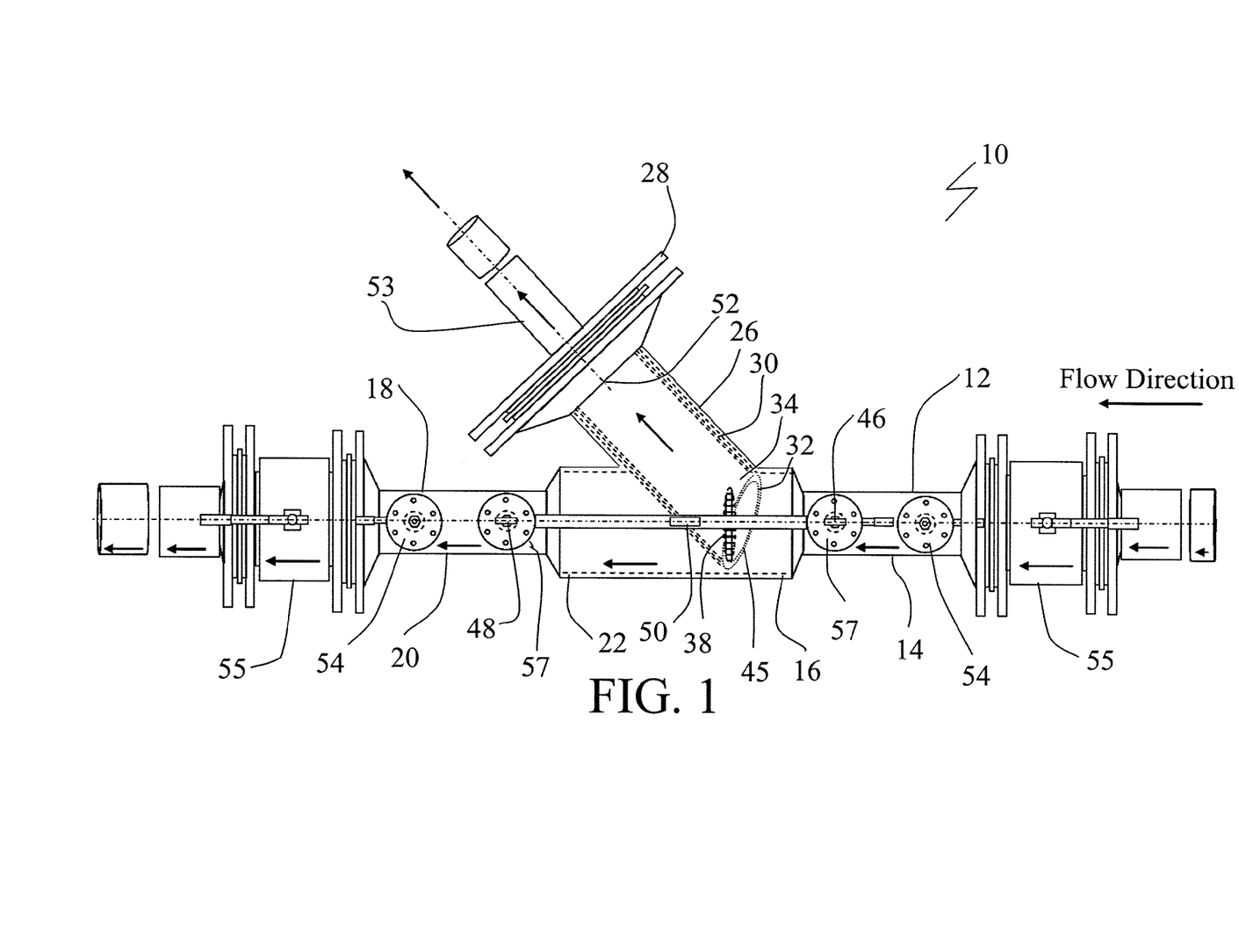
FIG. 1 is a top plan view of a Y strainer assembly.
Figure 2:
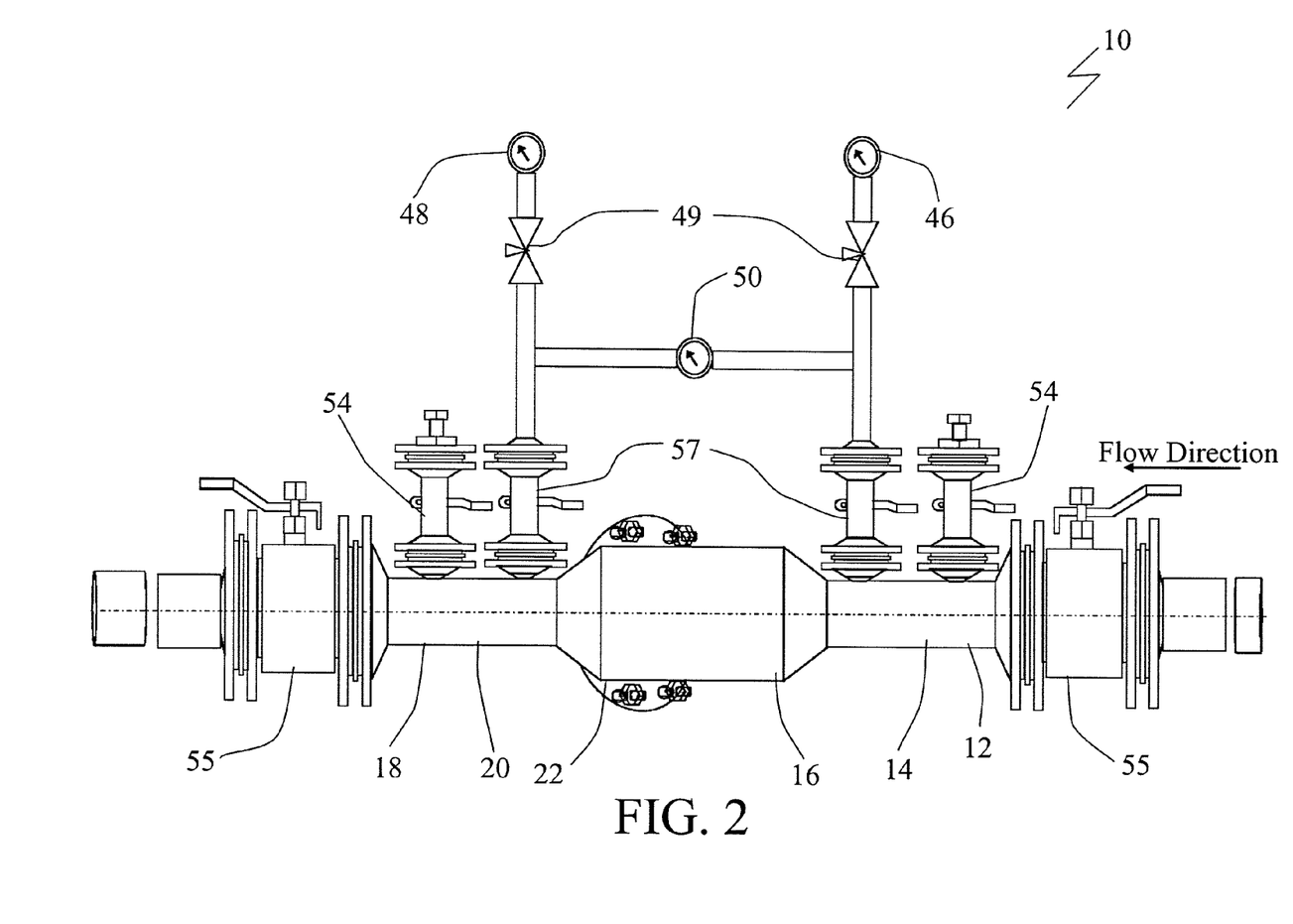
FIG. 2 is a front elevation view of the Y strainer assembly shown in FIG. 1.
Figures 3, 4:
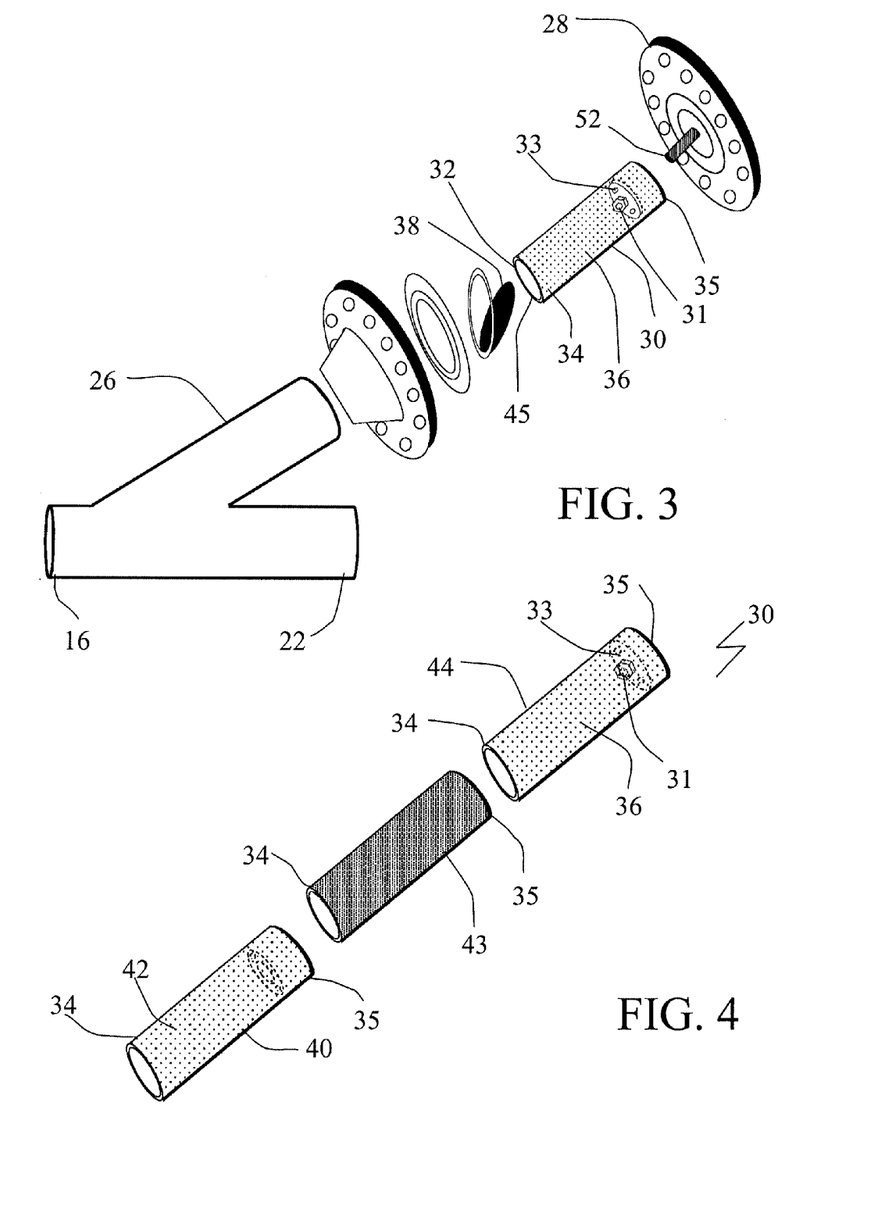
FIG. 3 is an exploded view of the cartridge receiving pipe and filter cartridge.
FIG. 4 is an exploded view of a filter cartridge.
Figure 5:
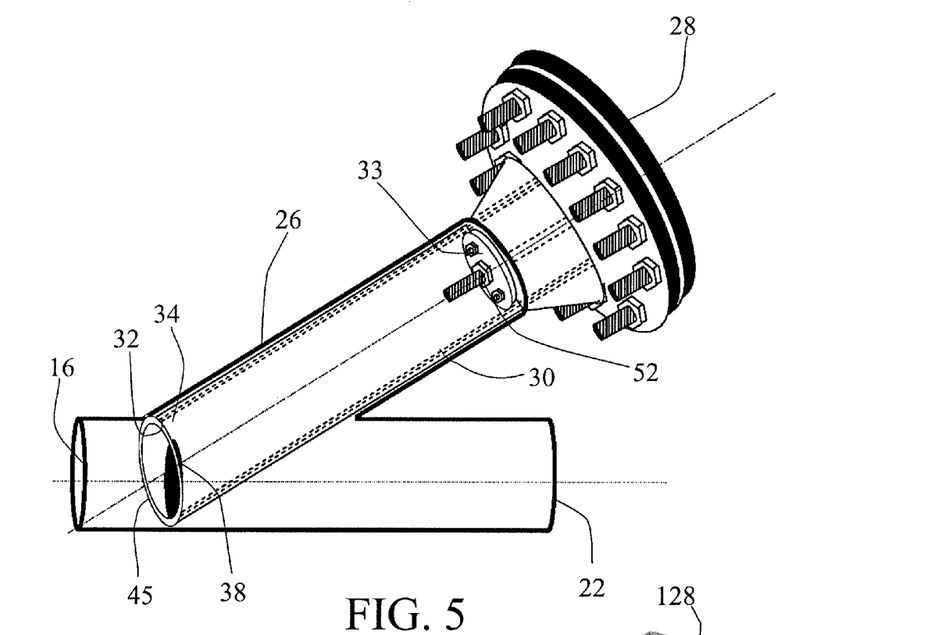
FIG. 5 is a top plan view of the cartridge receiving pipe and filter cartridge.

Structure and Relationship of Parts:

Referring to FIG. 1, a Y strainer assembly 10 has an inlet pipe 12 with a first portion 14 of a first diameter and a second portion 16 of a second diameter that is 50% larger than the first diameter. An outlet pipe 18 has a first portion 20 of the first diameter and a second portion 22 of the second diameter. Referring to FIG. 2 and FIG. 5, a cartridge receiving pipe 26 of the second diameter is in fluid communication with the second portion 16 of the inlet pipe 12 and the second portion 22 of the outlet pipe 18. When filter cartridge 30 is in position, fluids are unable to pass directly from inlet pipe 12 to outlet pipe 18 without first passing through filter cartridge 30. With filter cartridge 30 in position, fluids pass from the inlet pipe 12 into the cartridge receiving pipe 26 and from the cartridge receiving pipe 26 into the outlet pipe 18. The cartridge receiving pipe 26 has a closure 28 which can be opened to facilitate insertion of filter cartridge 30. Referring to FIG. 3, filter cartridge 30 has an inlet 32 at an inlet end 34 for receiving an inflow of fluids from the inlet pipe 12 and apertures 36 in a peripheral sidewall 44 through which an outflow of fluids pass into the outlet pipe 18. An end plate 33 with a centrally positioned blow down opening 31 is positioned at the opposite end 35 from inlet end 34 of filter cartridge 30. Blow down valve 52 is passed through blow down opening 31 when closure 28 is in the closed position.

In the embodiment shown, filter cartridge 30 supports a deflector 38. Fluids flowing along the inlet pipe 12, strike the deflector 38 and are deflected into the filter cartridge 30. Referring to FIG. 4, filter cartridge 30 has an inner sleeve 40 with flow apertures 42 and a flexible mesh filter 43 which is retained between the inner sleeve 40 and the peripheral sidewall 44. Referring to FIG. 3, inlet end 34 of filter cartridge 30 defines a wedge 45 which is wedged into the inlet pipe 12 to make a connection through which fluids flow from the inlet pipe 12 into the inlet end 34 of the filter cartridge 30.

Referring to FIG. 1 and FIG. 2, an upstream sensor 46 is positioned in the inlet pipe 12 upstream of the filter cartridge 30 and a downstream sensor 48 is positioned in the outlet pipe 18 downstream of the filter cartridge 30. A differential sensor 50 compares the outflow between the upstream sensor 46 and the downstream sensor 48 which provides an indication of sand accumulation within the filter cartridge 30. The above described sensors can be isolated from fluid flow, for servicing by closing valves 49. Referring to FIG. 1, a blow down valve 52 is positioned in the closure 28 of the cartridge receiving pipe 26; to permit a conduit 53 to be attached through which sand accumulations on the filter cartridge 30 may be purged. Referring to FIG. 1 and FIG. 2, valves 54 are positioned on the inlet pipe 12 and the outlet pipe 18 to permit the injection of fluids either upstream or downstream of filter cartridge 30 of Y strainer assembly 10. Valves 55 are positioned at either end of Y strainer assembly 10 and provide means of isolating Y strainer assembly 10 during servicing and maintenance.

Operation:

Referring to FIG. 3, closure 28 is opened and a cartridge 30 is inserted into cartridge receiving pipe 26 such that inlet end 34 of filter cartridge 30 receives an inflow of fluids from the inlet pipe 12 and an outflow of fluids into the outlet pipe 18 must pass through filter cartridge 30. Referring to FIG. 1, fluid flows through inlet pipe 12 through first portion 14 into second portion 16. Due to the difference in diameter between first portion 14 and second portion 16, the velocity of fluid is slowed. Fluid strikes deflector 38, which deflects the fluid into cartridge 30 and further slows the velocity of the fluid. Referring to FIG. 1 and FIG. 2, upstream sensor 46 senses the pressure of fluid flowing through inlet 12 and downstream sensor 48 senses the pressure of fluid flowing through outlet 18. Differential 50 provides an indication of sand accumulation within the filter cartridge 30 by comparing the outflow between the upstream sensor 46 and the downstream sensor 48. Valves 55 may be used to selectively isolate the Y strainer. Valves 54 may be used inject chemicals into Y strainer assembly 10, either upstream or downstream of filter cartridge 30. Valves 57 may be used to selectively isolate the upstream sensor 46 and the downstream sensor 48 from the Y strainer assembly 10 to allow for maintenance or replacement of sensors 46 and 48. Referring to FIG. 1, periodically conduit 53 may be attached to blow down valve 52 and sand that has accumulated within the filter cartridge 30 may be purged using either system pressure or a circulation of fluids through valves 54.

The velocity of fluids entering the filter cartridge 30 is slowed as fluids pass from first portion 14 of inlet pipe 12 to second portion 16 which has a larger diameter prior to entering the filter cartridge 30. The velocity is further slowed by deflector 38 which is positioned across inlet pipe 12 at the inlet into filter cartridge 30. The slowing of the velocity of the fluids passing through Y strainer assembly 10 has a dramatic effect on the ability of the Y strainer assembly to remove the sand. The use of the deflector 38 also helps to protect the filter elements in filter cartridge 30.

When building test units going from a 4 inch diameter to a 6 inch diameter worked well. However, when a unit was built going from a 4 inch diameter to an 8 inch diameter it worked even better.

Advantages:

The Y strainer described above provides a number of advantages:

- There are devices that will work either when there is sand in gas or when there is sand in oil, but not both. The Y strainer described above can work with either gas or oil.
- There are devices that are adversely affected by the presence of hydrates and condensates. The Y strainer described is not particularly sensitive to the presence of hydrates and condensates.

There are devices that can only operate efficiently within specified flow rate parameters and pressure level parameters. The Y strainer described above can work over a wide variety of flow rates and pressure levels.

Competitive sand removal devices are very expensive in comparison to the Y strainer described above.

The foot print of the Y strainer is relatively small and installation relatively simple, when compared to other sand removal technologies.

The Y strainer can be rapidly blown down in situ, to remove accumulated sand and place the Y strainer back into service.

The Y strainer can have sensors attached to determine the amount of sand accumulated. This can be as simple as an upstream and downstream pressure gauge that can be viewed by personnel on site or can be sensors that tie into a SCADA system for remote monitoring.

There are other devices with respect to which replacing worn parts can be relatively expensive. The primary consumable with the Y strainer described above is the flexible mesh. The flexible mesh costs approximately $10.00 and can be changed out in 15 to 20 minutes.

The "wedge" seating of the canister ensures correct placement.

The flexible mesh is protected by both the deflector plate and the interior sleeve.

Variations:

A variation of a Y strainer assembly, generally referenced as numeral 100 will now be described with reference to FIG. 6 and FIG. 7.

Figure 7:
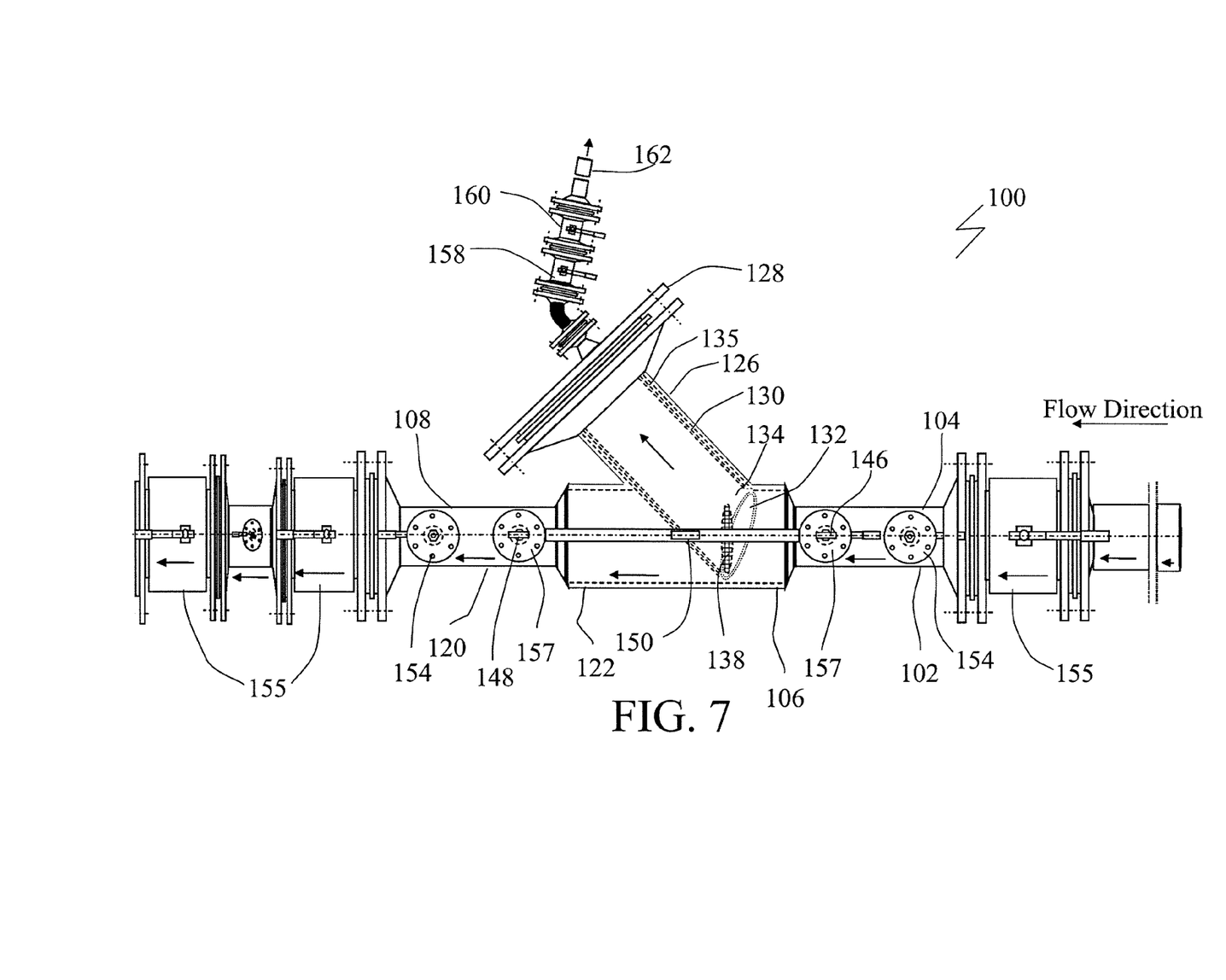
FIG. 7 is a top plan view of a variation of a Y strainer assembly.

Referring to FIG. 7, Y strainer assembly 100 has an inlet pipe 102 with a first portion 104 of a first diameter and a second portion 106 of a second diameter that is 50% larger than the first diameter. An outlet pipe 108 has a first portion 120 of the first diameter and a second portion 122 of the second diameter. A cartridge receiving pipe 126 of the second diameter is in fluid communication with the second portion 106 of the inlet pipe 102 and the second portion 122 of the outlet pipe 108. When filter cartridge 130 is in position, fluids are unable to pass directly from inlet pipe 102 to outlet pipe 108 without first passing through filter cartridge 130. With filter cartridge 130 in position, fluids pass from the inlet pipe 102 into the cartridge receiving pipe 126 and from the cartridge receiving pipe 126 into the outlet pipe 108. The cartridge receiving pipe 126 has a closure 128 which can be opened to facilitate insertion of filter cartridge 130.

Figure 6:
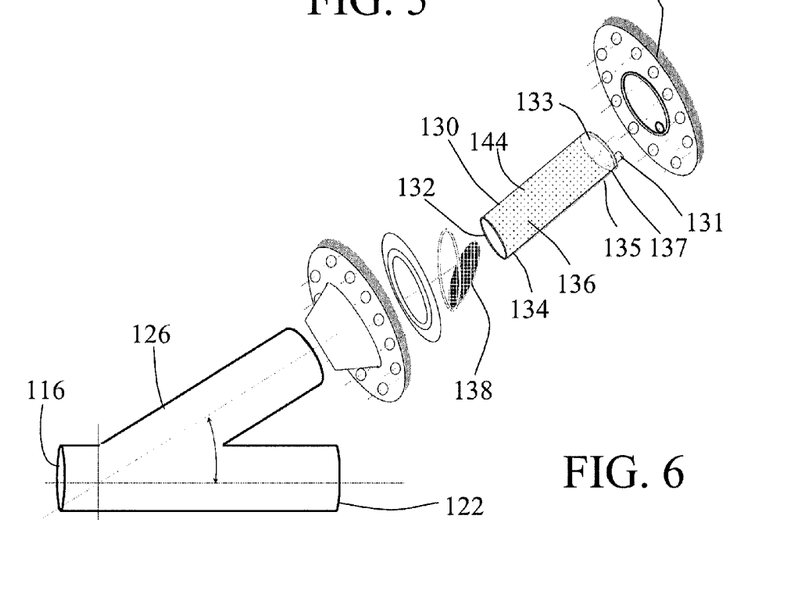
FIG. 6 is an exploded view of a variation of the cartridge receiving pipe and filter cartridge.
Figure 9:
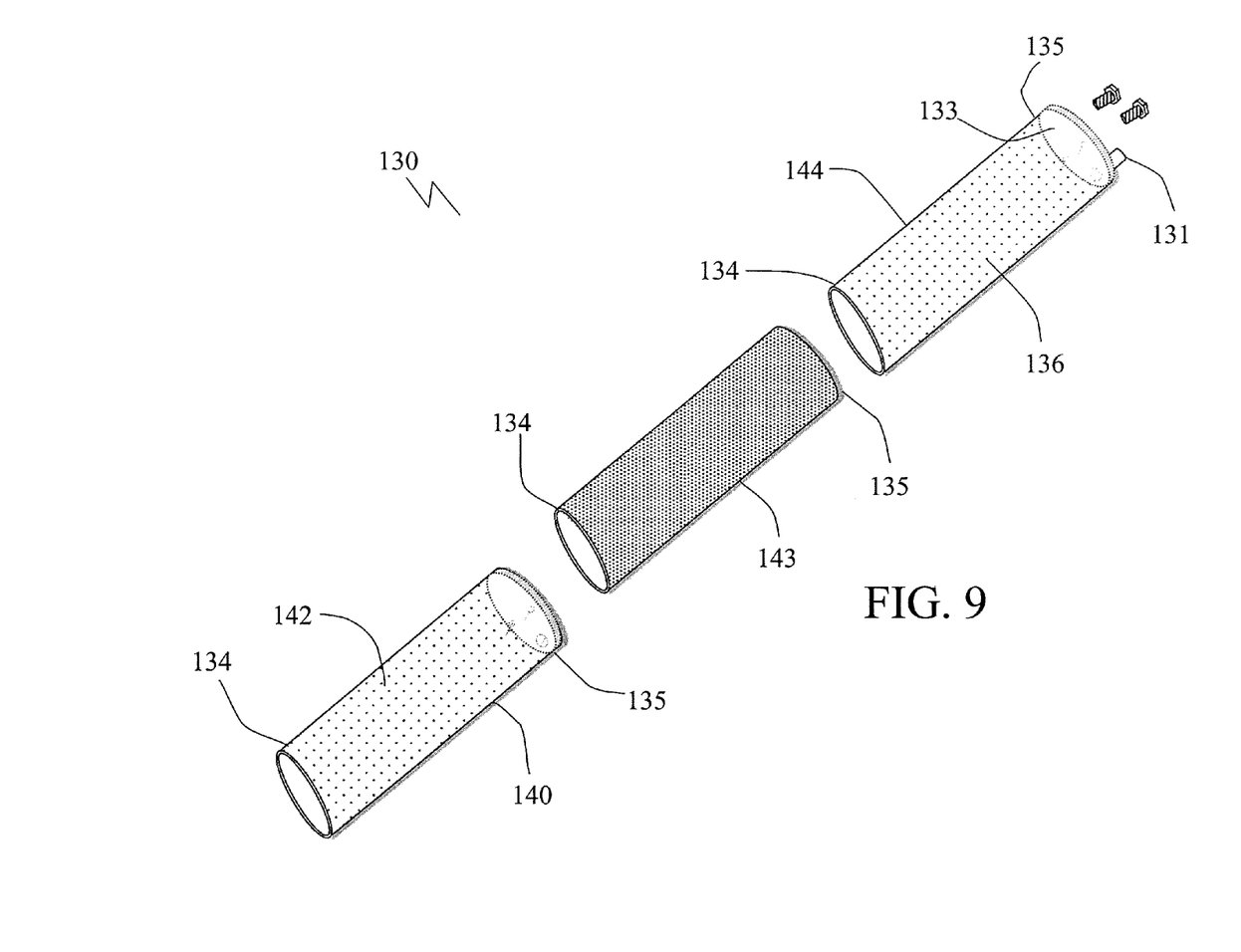
FIG. 9 is an exploded view of a filter cartridge used in the Y strainer assembly shown in FIG. 7.

Referring to FIG. 6, filter cartridge 130 has an inlet 132 at an inlet end 134 for receiving an inflow of fluids from the inlet pipe 102 and apertures 136 in a peripheral sidewall 144 through which an outflow of fluids pass into the outlet pipe 108. Referring to FIG. 9, filter cartridge 130 has an inner sleeve 140 with flow apertures 142 and a flexible mesh filter 143 which is retained between the inner sleeve 140 and the peripheral sidewall 144. Referring to FIG. 6, an end plate 133 is positioned at the opposite end 135 from inlet end 134 of filter cartridge 130. End plate 133 has a blow down opening 131 in an off center position along a lower side 137 when filter 130 is in position at an angle. This off center position allows for removal of virtually all of the sand on blow down. It was discovered during field tests that with a centrally positioned blow down opening a residue of sand would remain trapped along the edges of filter cartridge 130. A blow down opening 131 in an off center position removes a greater amount of sand along the edges of filter cartridge 130 as sand from above falls to the lower side of filter cartridge 130 and a blow down through opening 131 directs the blow down to the lower side of filter cartridge 130. In the embodiment shown, filter cartridge 130 supports a deflector 138. Fluids flowing along the inlet pipe 102, strike the deflector 138 and are deflected into the filter cartridge 130.

Figure 8:
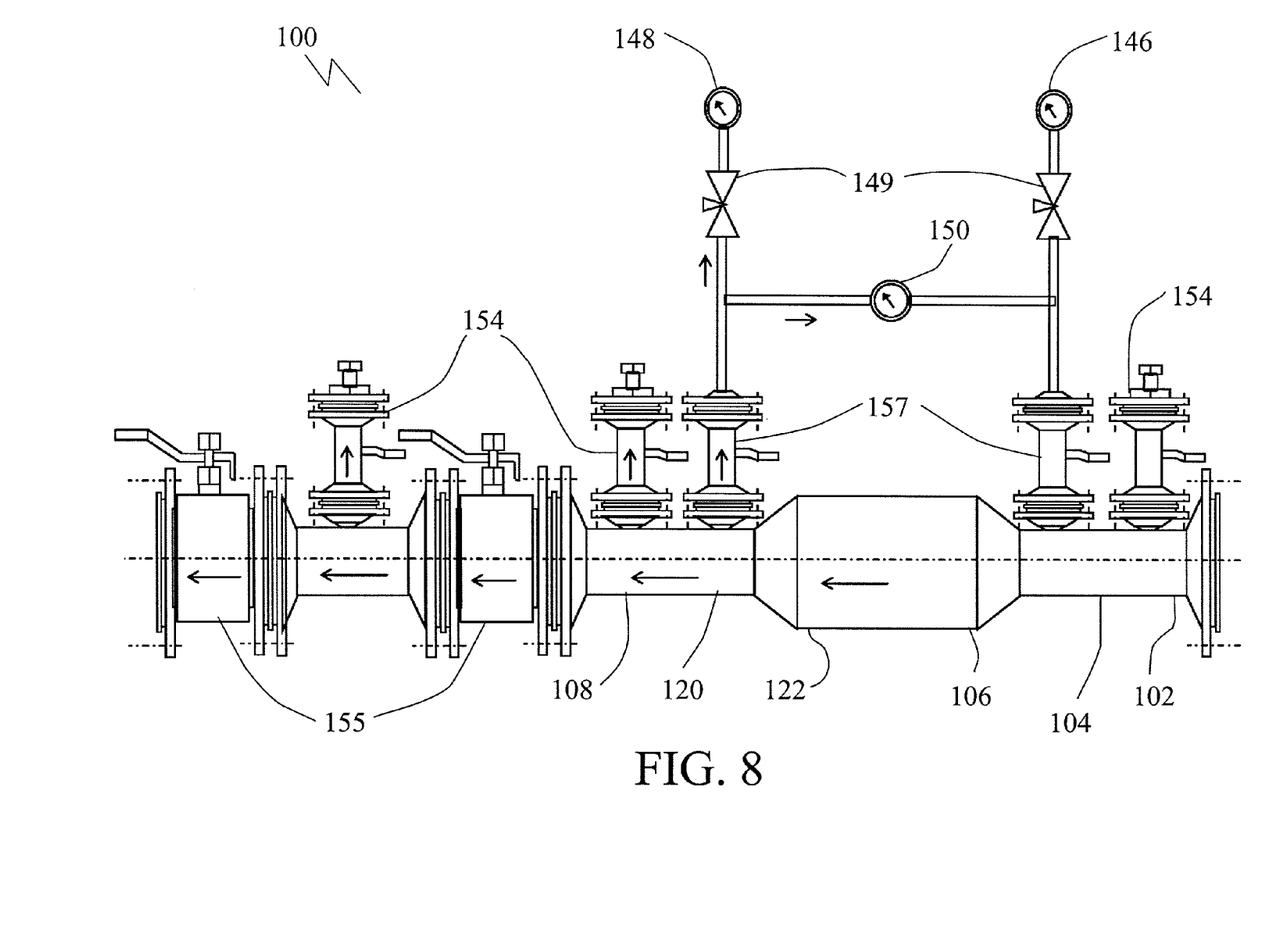
FIG. 8 is a front elevation view of the variation of the Y strainer assembly shown in FIG. 7.

Referring to FIG. 7 and FIG. 8, an upstream sensor 146 is positioned in the inlet pipe 102 upstream of the filter cartridge 130 and a downstream sensor 148 is positioned in the outlet pipe 108 downstream of the filter cartridge 130. A differential sensor 150 compares the outflow between the upstream sensor 146 and the downstream sensor 148 which provides an indication of sand accumulation within the filter cartridge 130. Valves 157 may be used to selectively isolate the upstream sensor 146 and the downstream sensor 148 from the Y strainer assembly 100 to allow for maintenance or replacement of sensors 146 and 148. Referring to FIG. 8, the above described sensors can be isolated from fluid flow, for servicing by closing valves 149. Referring to FIG. 7, valves 154 are positioned on the inlet pipe 102 and the outlet pipe 108 to permit the injection of fluids either upstream or downstream of filter cartridge 130 of Y strainer assembly 100. Valves 155 are positioned at either end of Y strainer assembly 100 and provide means of isolating Y strainer assembly 100 during servicing and maintenance. A series of valves 158 and 160 are positioned beyond closure 128 and in communication with a drain 162 and blow down opening 131 that enables a blow down procedure to be performed by opening and closing valves 158 and 160 to utilize system pressure. Beneficial results have been seen when valve 158 is a ball valve and valve 160 is a choke valve, however it will be understood that different types of valves may be used. This allows everything to remain online during the blow down to optimize production capacity of assembly 100.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A method of increasing efficiency of a Y strainer having a filter cartridge receiving inflow through one end and outflow through apertures in a peripheral sidewall, the method comprising:

slowing a velocity of fluids entering the filter cartridge of the Y strainer by having the fluids pass from a first portion of a first diameter into a second portion of a second diameter which is at least 50% larger than the first diameter prior to entering the filter cartridge, the filter cartridge being inserted into a filter cartridge receiving pipe in fluid communication with the second portion, the filter cartridge receiving pipe having the second diameter, wherein the filter cartridge has an inner sleeve with flow apertures and a flexible mesh filter which is retained between the inner sleeve and the peripheral sidewall;

wherein the velocity of fluids entering the filter cartridge of the Y strainer is further slowed by positioning a deflector plate supported at an inlet end of the filter cartridge and extending into the filter cartridge at an acute angle to the inlet end of the filter cartridge such that a major portion of the fluids flowing along an inlet pipe strike the deflector plate and are deflected into the filter cartridge.

2. The method of claim 1, wherein the deflector plate forms part of the filter cartridge.

3. A Y strainer assembly, comprising:
an inlet pipe having a first portion of a first diameter and a second portion of a second diameter that is at least 50% larger than the first diameter;
an outlet pipe having a first portion of the first diameter and a second portion of the second diameter;
a cartridge receiving pipe of the second diameter in fluid communication with the second portion of the inlet pipe and the second portion of the outlet pipe, such that fluids may only pass from the inlet pipe into the cartridge receiving pipe and from the cartridge receiving pipe into the outlet pipe, the cartridge receiving pipe having a closure which can be opened to facilitate insertion of a filter cartridge; and
a filter cartridge having an inlet at an inlet end for receiving an inflow of fluids from the inlet pipe and apertures in a peripheral sidewall through which an outflow of fluids pass into the outlet pipe, wherein the filter cartridge has an inner sleeve with flow apertures and a flexible mesh filter which is retained between the inner sleeve and the peripheral sidewall; and
a deflector plate supported at the inlet end of the filter cartridge and extending into the filter cartridge at an acute angle to the inlet end of the filter cartridge such that a major portion of the fluids flowing along the inlet pipe strike the deflector plate and are deflected into the filter cartridge.

4. The Y strainer assembly of claim 3, wherein the inlet end of filter cartridge defines a wedge which is wedged into the inlet pipe to make a connection through which fluids flow from the inlet pipe into the filter cartridge.

5. The Y strainer assembly of claim 3, wherein an upstream sensor is positioned in the inlet pipe upstream of the filter cartridge and a downstream sensor is positioned in the outlet pipe downstream of the filter cartridge, a differential in output between the upstream sensor and the downstream sensor providing an indication of sand accumulation within the filter cartridge.

6. The Y strainer assembly of claim 3, wherein a blow down valve is positioned in the closure of the cartridge receiving pipe through which sand accumulations on the filter cartridge may be purged.

7. The Y strainer assembly of claim 3, wherein valves are positioned on the inlet pipe and the outlet pipe.

8. The Y strainer assembly of claim 3, wherein at least one valve is attached to the cartridge receiving pipe through which sand accumulations on the filter cartridge may be purged.

9. The Y strainer assembly of claim 8, wherein two valves are attached to the cartridge receiving pipe.

10. The Y strainer assembly of claim 9, wherein the valves are a ball valve and a choke valve.

11. The Y strainer assembly of claim 8, wherein a blow down opening is positioned centrally in the cartridge receiving pipe.

12. The Y strainer assembly of claim 8, wherein a blow down opening is positioned off center along a lower side of the cartridge receiving pipe.

* * * * *